United States Patent
Teichman et al.

(10) Patent No.: US 8,326,714 B1
(45) Date of Patent: Dec. 4, 2012

(54) EMPLOYEE PRE-PAYROLL PAYCHECK PREVIEW

(75) Inventors: Timothy Steuart Teichman, Sunnyvale, CA (US); Lucinda Kathryn Foss, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 262 days.

(21) Appl. No.: 12/345,497

(22) Filed: Dec. 29, 2008

(51) Int. Cl.
G06F 15/02 (2006.01)
G07C 1/10 (2006.01)
G07F 19/00 (2006.01)
H04M 15/00 (2006.01)
G06Q 10/00 (2012.01)

(52) U.S. Cl. .............. 705/32; 705/34; 705/44; 705/328; 705/345

(58) Field of Classification Search ................ 705/32, 705/34, 44, 328, 345
See application file for complete search history.

(56) References Cited

U.S. PATENT DOCUMENTS

| | | | | |
|---|---|---|---|---|
| 6,401,079 B1* | 6/2002 | Kahn et al. | | 705/30 |
| 6,850,905 B2* | 2/2005 | Kelly | | 705/32 |
| 7,120,664 B2* | 10/2006 | Sawa et al. | | 709/203 |
| 7,213,064 B2* | 5/2007 | Smith et al. | | 709/223 |
| 7,229,013 B2* | 6/2007 | Ben-Aissa | | 235/380 |
| 7,233,919 B1* | 6/2007 | Braberg et al. | | 705/32 |
| 7,426,486 B2* | 9/2008 | Treibach-Heck et al. | | 705/32 |
| 7,546,318 B2* | 6/2009 | Bates | | 1/1 |
| 7,620,564 B1* | 11/2009 | Lippock | | 705/10 |
| 7,620,654 B2* | 11/2009 | Turnasella | | 705/7.32 |
| 7,634,432 B2* | 12/2009 | Dracup et al. | | 705/32 |
| 7,636,665 B2* | 12/2009 | Cooperstone et al. | | 705/1.1 |
| 7,761,370 B1* | 7/2010 | Hicks et al. | | 705/38 |
| 7,797,211 B1* | 9/2010 | Reeth et al. | | 705/35 |
| 7,805,354 B2* | 9/2010 | Coleman et al. | | 705/37 |
| 7,813,989 B2* | 10/2010 | Jones et al. | | 705/36 R |
| 7,941,351 B1* | 5/2011 | Rosenfeld et al. | | 705/30 |
| 2002/0069144 A1* | 6/2002 | Palardy | | 705/32 |
| 2004/0019542 A1* | 1/2004 | Fuchs et al. | | 705/32 |
| 2004/0049436 A1* | 3/2004 | Brand et al. | | 705/30 |
| 2004/0138944 A1* | 7/2004 | Whitacre et al. | | 705/11 |
| 2007/0055592 A1* | 3/2007 | Vu | | 705/32 |
| 2007/0061251 A1* | 3/2007 | Watkins | | 705/39 |
| 2009/0192926 A1* | 7/2009 | Tarapata | | 705/32 |
| 2009/0241026 A1* | 9/2009 | Augustine et al. | | 715/700 |
| 2009/0241056 A1* | 9/2009 | Augustine et al. | | 715/781 |
| 2010/0070395 A1* | 3/2010 | Elkeles et al. | | 705/32 |
| 2010/0070555 A1* | 3/2010 | Duparc et al. | | 709/202 |

* cited by examiner

*Primary Examiner* — Elaine Gort
*Assistant Examiner* — Peter L Ludwig
(74) *Attorney, Agent, or Firm* — Osha Liang LLP

(57) ABSTRACT

A method for providing payroll information for a worker of an employer. The method includes obtaining, from the worker, an earnings item for a portion of a payroll period, adding the earnings item to a payroll account of the worker, updating a balance of the payroll account using the earnings item to obtain an updated balance, and calculating a compensation amount for the worker prior to processing payroll of the employer. The compensation amount is calculated using the updated balance. The method further includes displaying the updated balance and the compensation amount for the payroll period prior to processing payroll of the employer.

11 Claims, 6 Drawing Sheets

US 8,326,714 B1

EMPLOYEE PRE-PAYROLL PAYCHECK PREVIEW

BACKGROUND

A payroll system is designed to process employee compensation and benefits for individual payroll periods. Employees may be salaried workers or contract workers. Salaried employees receive a constant amount of compensation each payroll period based on an annual salary. On the other hand, contract workers receive compensation commensurate to an hourly wage multiplied by the number of hours worked in a payroll period. Additionally, salaried and/or contract employees may earn wages based on commissions for sales, tips, or completion of projects. Whatever the compensation structure, employees receive wages at the end of specified payroll periods (e.g., weekly, bi-weekly, monthly, etc.). Additionally, employees cannot typically view the amount of compensation earned prior to the issuance of compensation at the end of a payroll period. The issuance of compensation often takes the form of a paycheck, direct deposit, or other similar means.

Generic tools exist for estimating the amount of compensation an employee earns prior to the end of a payroll period. For example, web-based paycheck calculators estimate the amount of wages earned over a specific period, based on an hourly pay rate manually entered by the user. These web-based tools typically do not take into account other factors specific to the manner in which a particular individual is compensated.

SUMMARY

In general, in one aspect, the invention relates to a method for providing payroll information for a worker of an employer. The method includes obtaining, from the worker, an earnings item for a portion of a payroll period, adding the earnings item to a payroll account of the worker, updating a balance of the payroll account using the earnings item to obtain an updated balance, and calculating a compensation amount for the worker prior to processing payroll of the employer. The compensation amount is calculated using the updated balance. The method further includes displaying the updated balance and the compensation amount for the payroll period prior to processing payroll of the employer.

In general, in one aspect, the invention relates to a system for providing payroll information. The system includes a processor, a memory operatively connected to the processor, and a payroll preview application resident in memory. The payroll preview application includes a payroll engine. The payroll engine is configured to obtain, from a worker, an earnings item for a portion of a payroll period, add the earnings item to a payroll account of the worker, update a balance of the payroll account using the earnings item to obtain an updated balance, and calculate a compensation amount for the worker prior to processing payroll of the employer. The compensation amount is calculated using the updated balance. The payroll engine further includes a GUI module configured to display the updated balance and the compensation amount for the payroll period prior to processing payroll of the employer.

In general, in one aspect, the invention relates to a computer readable medium storing instructions to provide payroll information. The instructions that includes functionality to obtain, from a worker, an earnings item for a portion of a payroll period, add the earnings item to a payroll account of the worker, update a balance of the payroll account using the earnings item to obtain an updated balance, calculate a compensation amount for the worker prior to processing payroll of the employer. The compensation amount is calculated using the updated balance. The instructions further includes functionality to display the updated balance and the compensation amount for the payroll period prior to processing payroll of the employer.

Other aspects of the invention will be apparent from the following description and the appended claims.

DETAILED DESCRIPTION

Figure 1:
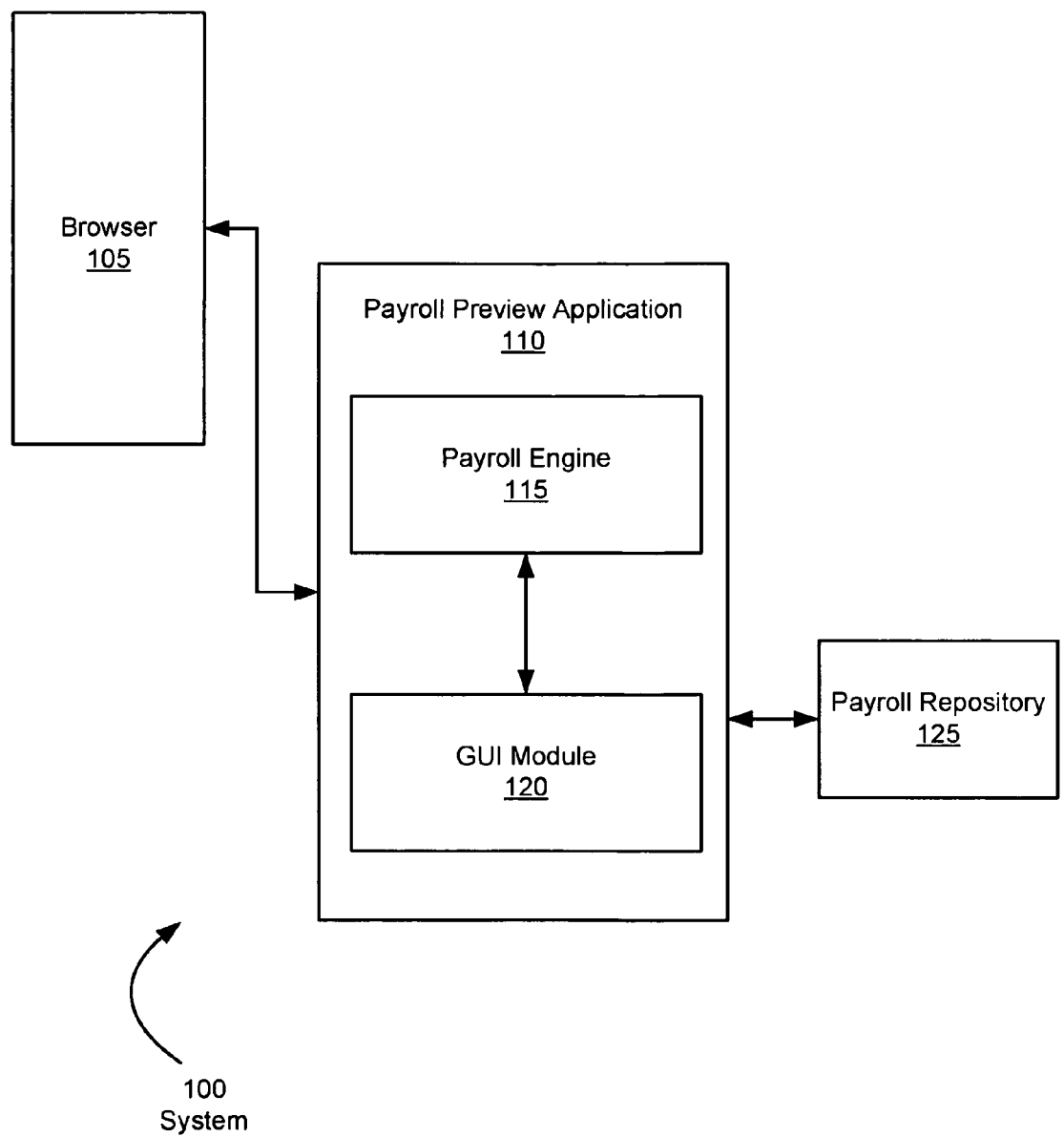
FIG. 1 shows a flow diagram system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for providing payroll information based on an earnings item. More specifically, embodiments of the invention provide a system and method for providing payroll information before the termination of a payroll period. Further, embodiments of the invention provide a system and method providing payroll information and a compensation amount.

FIG. 1 shows a system (100) in accordance with one or more embodiments of the invention. As shown in FIG. 1, the system (100) includes a browser (105), a payroll preview application (110), and a payroll repository (125). These aforementioned components may be located on the same device (e.g. a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Further, those skilled in the art will appreciate that there may be more than one payroll preview application and payroll repository running on a device, as well as more than one browser interfacing with those components. Additional detail about each of the aforementioned components is described below.

In one or more embodiments of the invention, a browser (105) may provide a user access to payroll information through a GUI (graphic user interface). More specifically, the GUI displays an interface for a user to interact with the payroll preview application (110). In particular, the GUI may act as a payroll preview portal, and provide an interface through which a user may provide input to the payroll preview application (110) or view output provided by the payroll preview application (110). Additionally, the GUI may be a plug-in for a desktop based application. Those skilled in the art will appreciate that there will be various other methods for providing input to and viewing output from the payroll preview application (110).

In one or more embodiments of the invention, a payroll preview application (110) provides payroll information based on an earnings item (e.g. hours worked, commissioned transactions, completed projects, tips earned). In one or more embodiments of the invention, the payroll preview application is implemented using a payroll engine (115) and a GUI module (120). In one or more embodiments of the invention, the GUI module (120) provides the GUI through which a user interacts with the payroll preview application (110). The GUI provided by the GUI module may be displayed in a browser (105). In one or more embodiments of the invention, the payroll engine (115) may provide various functionality associated with providing payroll information based on an earnings item. For example, the payroll engine (115) may include functionality to: (i) calculate an accumulated compensation amount based on the number of hours worked during a payroll period up to the current time and (ii) generate a predicted compensation based on a user's prior earnings items (e.g. time worked during a payroll period), which may provides an employee with the ability to predict compensation from payroll period to payroll period. Those skilled in the art will appreciate that the payroll engine (115) may include other functionality related to payroll processing not described above. In one or more embodiments of the invention, in addition to providing the aforementioned calculation functionality, the payroll preview application (110) may include functionality to interact with an external financial application. More specifically, the payroll preview application (110) may output predicted compensation information, which may be used by the external financial application to aid an employee in budgeting. Further, the payroll preview application (110) may receive input corresponding to past compensation from the external application, which may be used to show the employee trends in their compensation. Those skilled in the art will appreciate that data may be transferred between the payroll preview application and the external financial application for additional reasons not discussed above.

In one or more embodiments of the invention, the payroll preview application (110) may also be connected to a payroll repository (125). In one or more embodiments of the invention, is a persistent data store that includes data associated with (e.g., used by, generated by) the payroll preview application (110). The payroll repository (125) may be a relational database that stores data entries associated with the payroll preview application (110).

In one or more embodiments of the invention, a server (not shown) may host the payroll preview application (110) and the payroll repository (125). The server (not shown) may be connected in various network configurations (e.g. wired, wireless, LAN, WAN, and the like), and there may be more than one server hosting more than one payroll preview application and payroll repository. Those skilled in the art will appreciate that there will be numerous configurations in which the server (now shown) may be part of.

Figure 2:
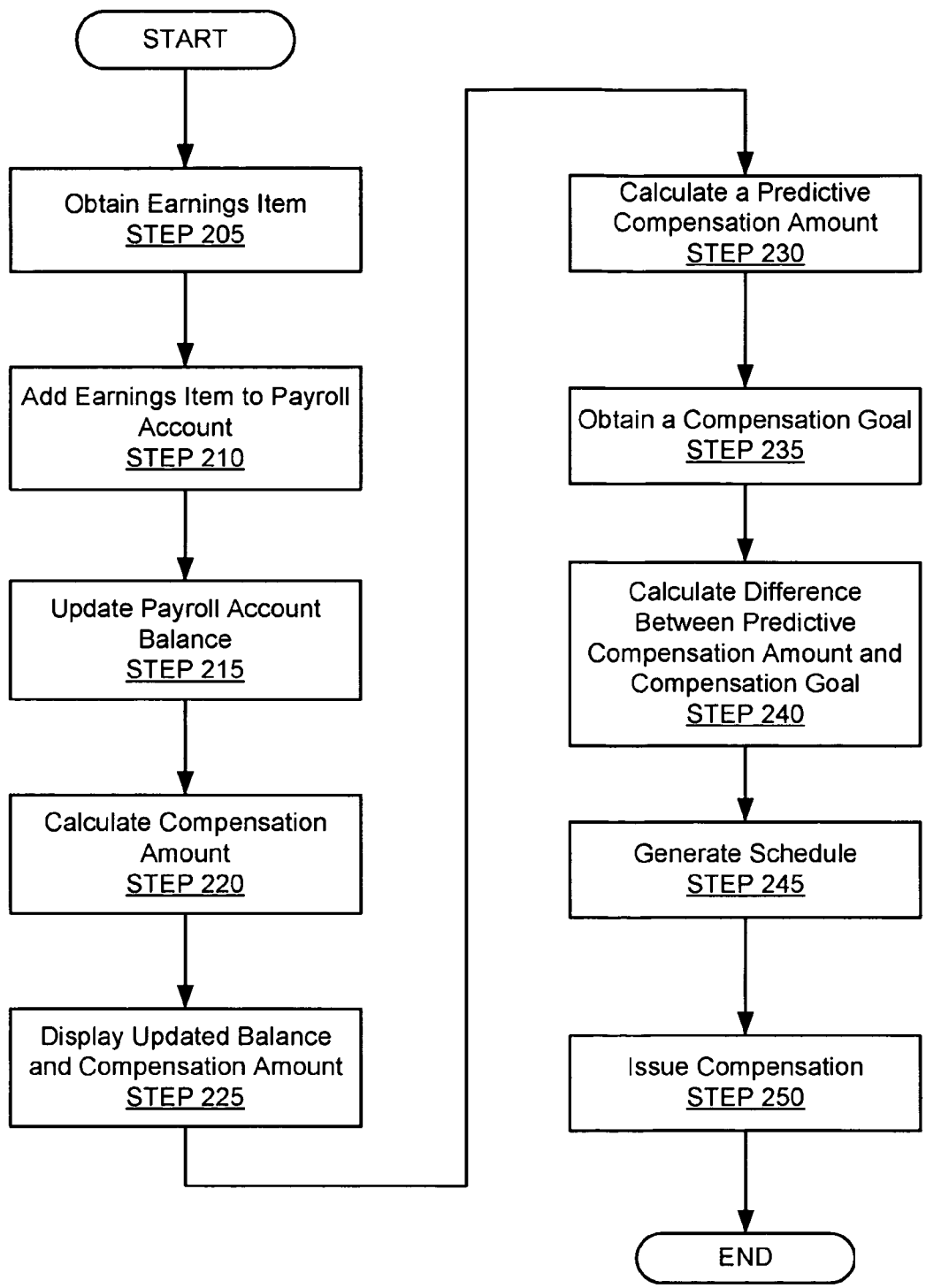
FIG. 2 shows a flowchart of a method in accordance with one or more embodiments of the invention.

FIG. 2 shows a flowchart in accordance with one or more embodiments of the invention. The process shown in FIG. 2 may be used, for example, with the system (100 in FIG. 1), to provide payroll information before the termination of a payroll period. Those skilled in the art will appreciate that the sequence of steps shown in FIG. 2 may differ among embodiments of the invention, and that one or more of the steps may be optional or otherwise omitted.

In STEP 205, an earnings item is obtained. The earnings item may be obtained by the payroll preview application, from a user (e.g. a worker or employee). The earnings item may be the number of hours worked by the user during a payroll period or portion thereof, commission sales successfully executed by the user, or any other item which is associated with the manner in which a work or employee is compensated. For example, if a payroll period is two weeks long, and the user has worked forty hours for the first week of that payroll period, then the earnings item reflects a value of forty hours. In another example, if the user has made ten sales in the first week of that payroll period, then the earnings item reflects a value of ten sales.

In STEP 210, the earnings item is added to a payroll account. The payroll account may include a running count of the number of hours worked by the user during the payroll period. The running total may be stored in the form of a payroll account balance. For instance, is the user has worked twenty hours for the first three days of the first week of a payroll period, a payroll account balance may reflect this with a value of twenty hours worked. Additionally, if the user is compensated on commission of successful sales, then if the user has made ten successful sales in the first three days of the first week of a payroll period, the payroll account balance may reflect this with a value of ten sales.

In STEP 215, the payroll account balance is updated. The payroll account balance may be updated with the earnings item. For instance, if the payroll account balance is currently twenty hours, and the earnings item has a value of forty hours, then the updated payroll account balance is sixty hours. In another example, if the payroll account balance is currently ten sales, and the earnings item has a value of twenty sales, then the updated payroll account balance is thirty sales.

In STEP 220, a compensation amount is calculated. The compensation amount may be calculated based on the updated payroll account balance. For example, if the employee is paid $40 per hour worked, and the payroll account balance has an updated value of sixty hours worked, then the compensation amount is $2,400 (i.e. $40*60). Additionally, if the employee is paid $100 for every successful sale, and the payroll account balance has an updated value of thirty sales, then the compensation amount is $3,000 (i.e. $100*30).

In STEP 225, the updated balance and compensation amount are displayed. These values may be displayed before the termination of the payroll period. For example, if the payroll period is fourteen days, the employee may view the updated balance and compensation amounts prior to end of the fourteenth day. Accordingly, the employee may view their up-to-date balance in their payroll account before the termination of the payroll period.

In STEP 230, a predictive compensation amount is calculated. The predictive compensation may estimate the value of the balance after termination of the payroll period. For example, if the updated balance is forty and seven days of the fourteen day payroll period has elapsed, then a predictive compensation of $3,200 may be calculated, based on the fact that the employee has earned $1,600 during 50% of the payroll period (i.e. $3,200=$1,600/0.5). The predictive compensation may be equal to compensation amount divided by the fraction of the payroll period that has progressed. Alternatively, the predictive compensation may be equal to the amount of hours worked multiplied by the salary rate of the employee divided by the fraction of the payroll period that has progressed. The predictive compensation may further aid an employee in managing a budget, as the employee is provided with additional information about their current and future financial status upon with which to base their spending decisions. Those skilled in the art will appreciate that there may be various other methods for calculating the predictive compensation amount.

In STEP 235, a compensation goal is obtained. The compensation goal may be a dollar amount specifying a compensation desired by the employee at the end of the payroll period. For example, the employee may specify a compensation goal of $4,800. This amount may vary from the predictive compensation amount (e.g. may be more or may be less).

In STEP 240, a difference between the predictive compensation amount and the compensation goal is calculated. For example, if the predictive compensation amount is $3,200, and the compensation goal is $4,800, the difference between these two values will be $1,600. This value may be reflective of a number of hours that the employee will be required to work in excess of the number of hours required to obtain the predictive compensation amount. For example, in the above scenario, in order to accomplish the compensation goal, the employee will be required to work forty hours in excess of the number of hours he/she is predicted to work for the remained of the payroll period.

In STEP 245, a schedule is generated. The schedule may be correlated with the difference between the predicted compensation amount and the compensation goal. For example, if the difference is $1,600, the employee will be required to work forty hours in excess of the number of predicted hours, based on the predicted compensation amount. Consequently, the schedule may reflect a distribution (uniform or non-uniform) of the forty difference hours across the days remaining before termination of the payroll period. For example, if there is a week remaining before termination of the payroll period, and there are forty excess number of hours based on the difference, then the schedule may determine that the employee should work sixteen hours per day for the remaining five work weekdays to accomplish the compensation goal of $4,800. In another example, the schedule may determine that the employee should work 11.43 hour days for seven days. The distribution scheme may vary according to employee and/or employer preferences. For example, if an employee is willing to work on weekends, then a work week may be considered seven days, otherwise a default of five days may be used. Additionally, if an employee has more or less time on specific days of the week (e.g. a parent has to attend soccer games of a child every Tuesday, therefore reducing the number of workable hours on Tuesdays) then the payroll preview application may take this into account when allocating hours to specific days for a schedule. Those skilled in the art will appreciate that there will be numerous methods by which the schedule may be generated.

In STEP 250, compensation is issued. The compensation may be issued after the termination of the payroll period. The compensation may be in the form of a check, direct deposit, cash, stock, or any other method for compensating the employee. The amount issued will be equal to the compensation amount.

Figure 3:
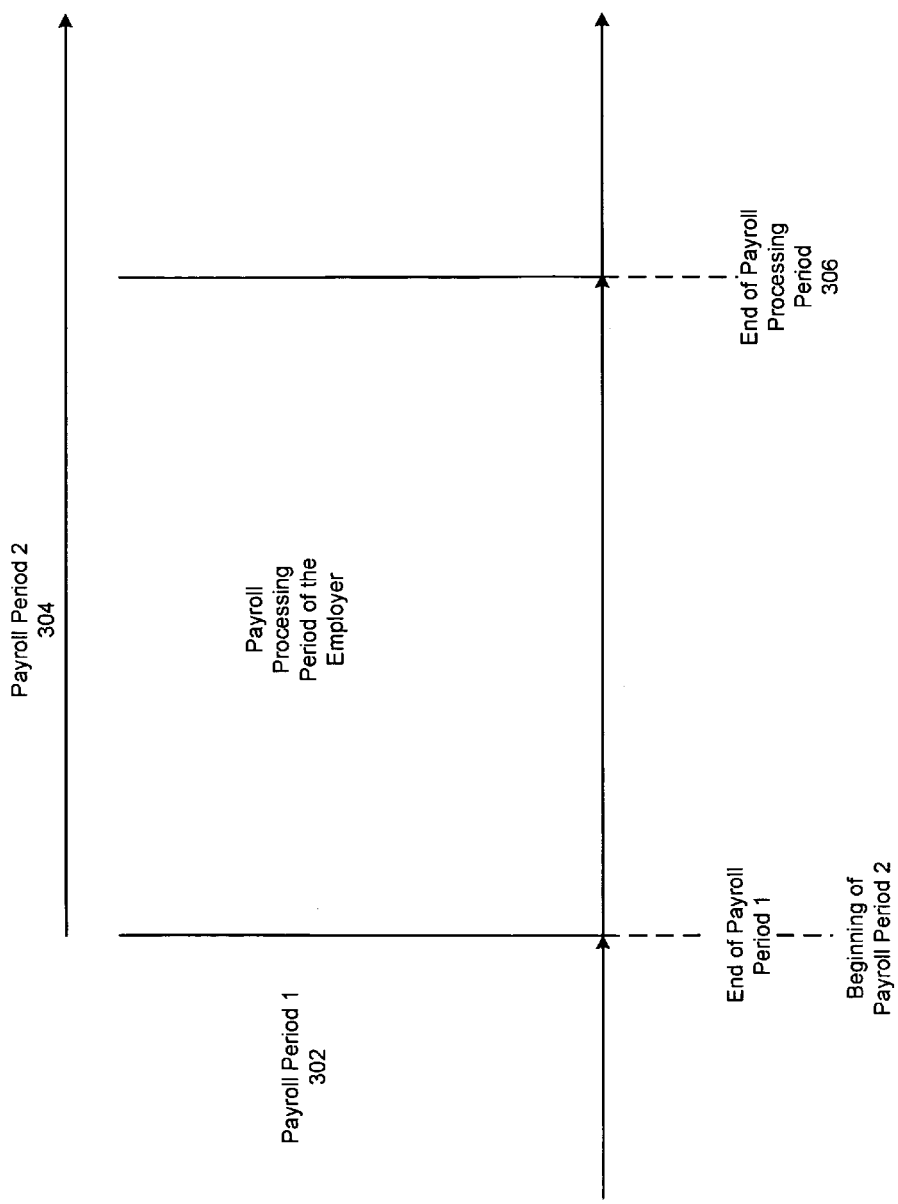
FIG. 3 shows a timeline in accordance with one or more embodiments of the invention.

FIG. 3 shows a timeline in accordance with one or more embodiments of the invention. The timeline shown in FIG. 3 may be used, for example, with the system (100 in FIG. 1), to represent times associated with payroll periods and processing periods. Those skilled in the art, having the benefit of this detailed description, will appreciate that the timeline shown in FIG. 3 may differ among embodiments of the invention, and that one or more parts of the timeline may be optional.

In one or more embodiments of the invention, a first payroll period (e.g. payroll period 1 (302)) may end just before a second payroll period (e.g. payroll period 2 (304)) begins. The first payroll period may be the time during which the earnings items (e.g. hours worked) of an employee contribute towards compensation issued at the end of a payroll processing period. The payroll processing period of the employer for the pay period 1 (302) may begin at the same time as the second payroll period begins. The payroll processing period may be the time in which an employer processes the earnings items associated with the first payroll period. For instance, during the payroll processing period, an employer may review the earnings items of multiple employees, obtain funds from a line of credit or commercial paper to meet payroll obligations, prepare checks assigned to employees, and perform various other activities associated with payroll. Although earnings items accumulated during the first payroll period may not be modified by an employee after the end of the first payroll period, certain items associated with the earnings items (e.g. wage per hour, 401K, healthcare allocations, and various other benefits) may be modified during the processing period of the employee.

In one or more embodiments of the invention, at the end of the payroll processing period (306), compensation (e.g. a paycheck, direct deposit) may be issued to an employee for earnings items (e.g. hours worked) accumulated during the first payroll period. Once the second payroll period begins, the employee may begin to accumulate earnings items (e.g. hours worked, successful sales completed) that contribute towards compensation distributed by the employer to the employee at the end of the second payroll period. Those skilled in the art, having the benefit of this detailed description, will appreciate that there may be many varying timelines associated with payroll periods and payroll processing periods.

Figure 4:
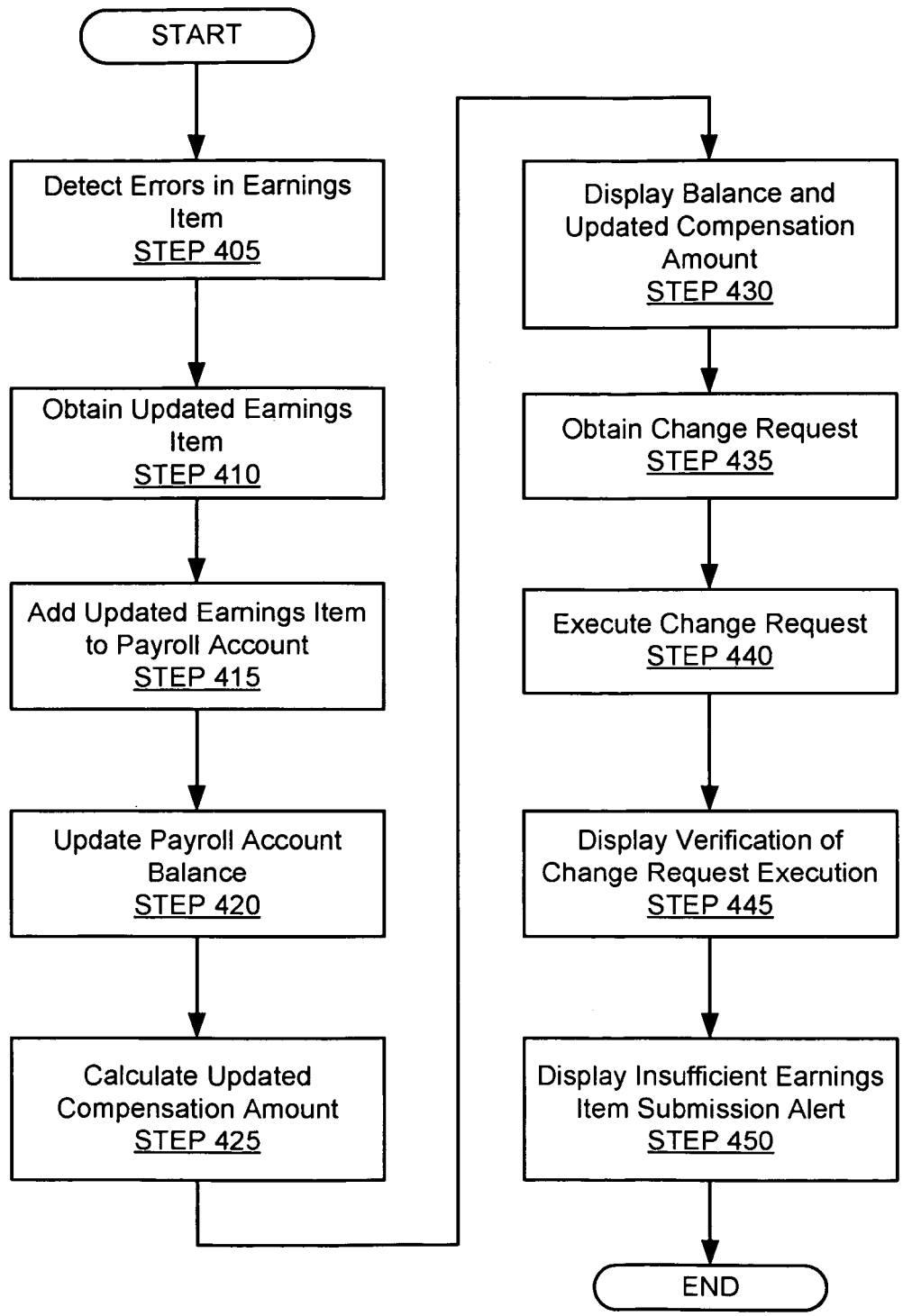
FIGS. 4 and 5 show flowcharts of examples in accordance with one or more embodiments of the invention.

FIG. 4 shows an example in accordance with one or more embodiments of the invention. The process shown in FIG. 4 may be used, for example, with the system (100 in FIG. 1), to detect errors in an earnings item and to update the earnings item. Those skilled in the art, having the benefit of this detailed description, will appreciate that the sequence of steps shown in FIG. 4 may differ among embodiments of the invention, and that one or more of the steps may be optional or otherwise omitted.

In STEP 405, one or more errors in the earnings item are detected. The errors may be, for instance, incorrect values (e.g. too few hours, too many hours, incorrect withholdings), invalid values (e.g. number of hours worked that is not a number), or any other error related to the earnings items. Further, errors may be detected that do not originate from a user. For example, if there is any internal inconsistency to the payroll preview application (110), an error may be flagged, and correction of the error through an updated earnings item may be requested.

In STEP 410, an updated earnings item is obtained. The updated earnings item may contain corrections to the errors found in STEP 405. For example, if an inconsistency has been identified that is internal to the payroll preview application, then the payroll preview application may seek to remedy this inconsistency with an updated earnings item. In this case an employee using the system may also be alerted to the situation, and may be asked to verify the updated earnings item. See STEP 205 for a further detailed description about obtaining the updated earnings item.

In STEP 415, the updated earnings item is added to a payroll account of the corresponding employee. See STEP 210 for a description about adding the updated earnings item to a payroll account. In STEP 420, the payroll account balance is updated. See STEP 215 for a description about updating the payroll account balance. In STEP 425, an updated compensation amount is calculated. See STEP 220 for a description about calculating the updated compensation amount. In STEP 430, a balance and updated compensation amount are displayed. See STEP 225 for a description about displaying the balance and updated compensation amount.

In STEP 435, a change request is obtained. The change request may be associated with a change to the payroll account (e.g. change in employee stock option allocation, additional bank account for direct deposits, 401k deduction modification, addition of a spouse to benefits, and the like). Additionally, an employer may provide a change request to the payroll preview application. For example, the employer may issue a change request in the case of a salary increase (or decrease) of an employee. Those skilled in the art will appreciate that there may be many other types of change requests.

In STEP 440, the change request is executed. The execution of the change request may be reflected in the payroll account. For example, if a user requests a change to a bank account for direct deposit from bank account A to bank account B, upon execution the direct deposit account will be changed from bank account A to bank account B. In one embodiment of the invention, the system (100) may be connected to one or more third-party systems to facilitate implementation of the change request. For example, if a user modifies a 401K allocation, the system (100 in FIG. 1) may transmit this information to the third party system of a 401K provider. When the 401K provider has executed the modification in their system, the system (100 in FIG. 1) may be informed.

In STEP 445, a verification of the change request execution is displayed. This verification may be displayed by a payroll preview application through the GUI in a browser to a user. The verification may inform an employee that the requested change was executed in the payroll account associated with the employee. Additionally, the verification may be displayed to the employee through other means, including text messages, email, or any other mechanism for communicating the aforementioned information.

In STEP 450, an alert for insufficient earnings item submission is displayed. This alert may be displayed by the payroll preview application to the employee. The alert may be displayed to the employee if the employee has failed to submit the necessary earnings items. This may occur when, for instance, the employee does not enter an earnings item at least once per payroll period. An alert may be issued to a user through various means, including email, text messaging, post mail, through the browser when the employee is accessing the payroll preview application GUI, and the like. Those skilled in the art will appreciate that there will be various ways in which an alert may be displayed. Though not shown in FIG. 4, in response to an alert in STEP 450, the employee may proceed to STEP 410 to update one or more earnings items in accordance with FIG. 4.

Figure 5:
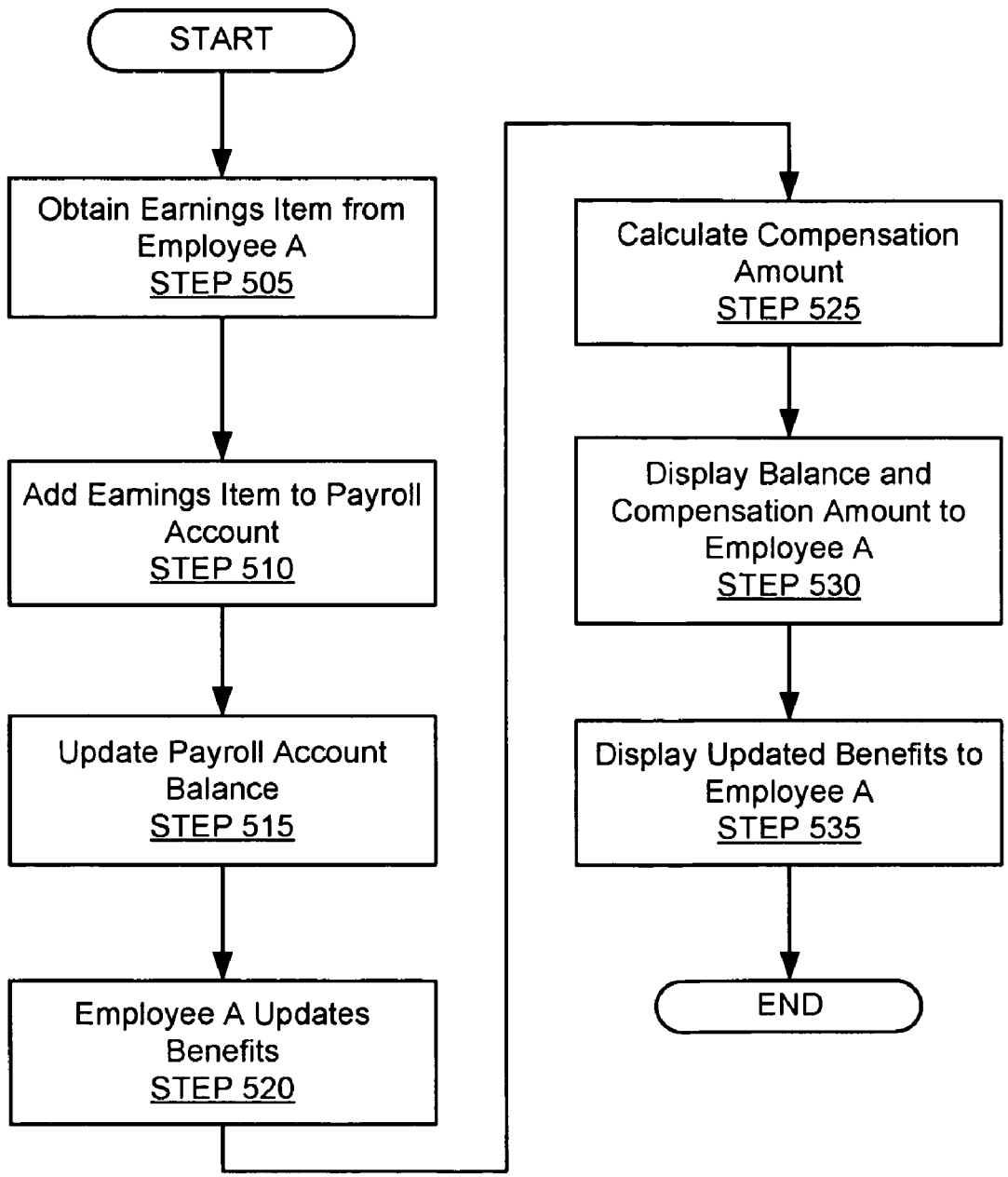

FIG. 5 shows an example in accordance with one or more embodiments of the invention. The process shown in FIG. 5 may be used, for example, with the system (100 in FIG. 1), to update benefits and to display updated benefits. Those skilled in the art, having the benefit of this detailed description, will appreciate that the sequence of steps shown in FIG. 5 may differ among embodiments of the invention, and that one or more of the steps may be optional or otherwise omitted.

In STEP 505, an earnings item is obtained. The earnings item may be obtained by the payroll preview application from Employee A. See STEP 205 for a detailed description about obtaining the earnings item.

In STEP 510, the earnings item is added to a payroll account. The payroll preview application may add the earnings item to the payroll account. See STEP 210 for a detailed description about adding the earnings item to a payroll account.

In STEP 515, the payroll account balance is updated. The payroll preview application may update the payroll account balance. See STEP 215 for a detailed description about updating the payroll account balance.

In STEP 520, benefits are updated. The benefits may be updated by Employee A through the payroll preview application prior to processing payroll of the employer. For example, a spouse may be added to a healthcare insurance plan, a 401K allocation may be modified, funds from a flexible spending account may be moved, and the like. Benefits may be updated by both an employee and an employer, prior to processing payroll of the employer. For instance, an employee may wish to modify a 401K allocation, and an employer may increase a salary amount resulting in an increase in the 401K distribution. Those skilled in the art will appreciate that there may be numerous method through which benefits may be updated.

In STEP 525, a compensation amount is calculated. The payroll preview application may calculate the compensation amount. See STEP 220 for a detailed description about calculating the compensation amount.

In STEP 530, a balance and compensation amount are displayed. The payroll preview application may display these values to Employee A through the GUI in a browser. See STEP 225 for a detailed description about displaying the balance and compensation amount.

In STEP 535, the updated benefits are displayed. The updated benefits may be displayed by a payroll preview application to Employee A through the GUI in a browser. For example, if a 401K allocation was modified, a user may view this modification and be alerted to the transaction associated with this modification when it occurs. The display of updated benefits may allow a user to view the benefits modifications in real time, as well as know when the benefits transactions have been executed with various third party benefit systems. Identification of these third party systems may be coupled with associated transaction times. Those skilled in the art will appreciate that there may be numerous methods by which to display updated benefits.

Figure 6:
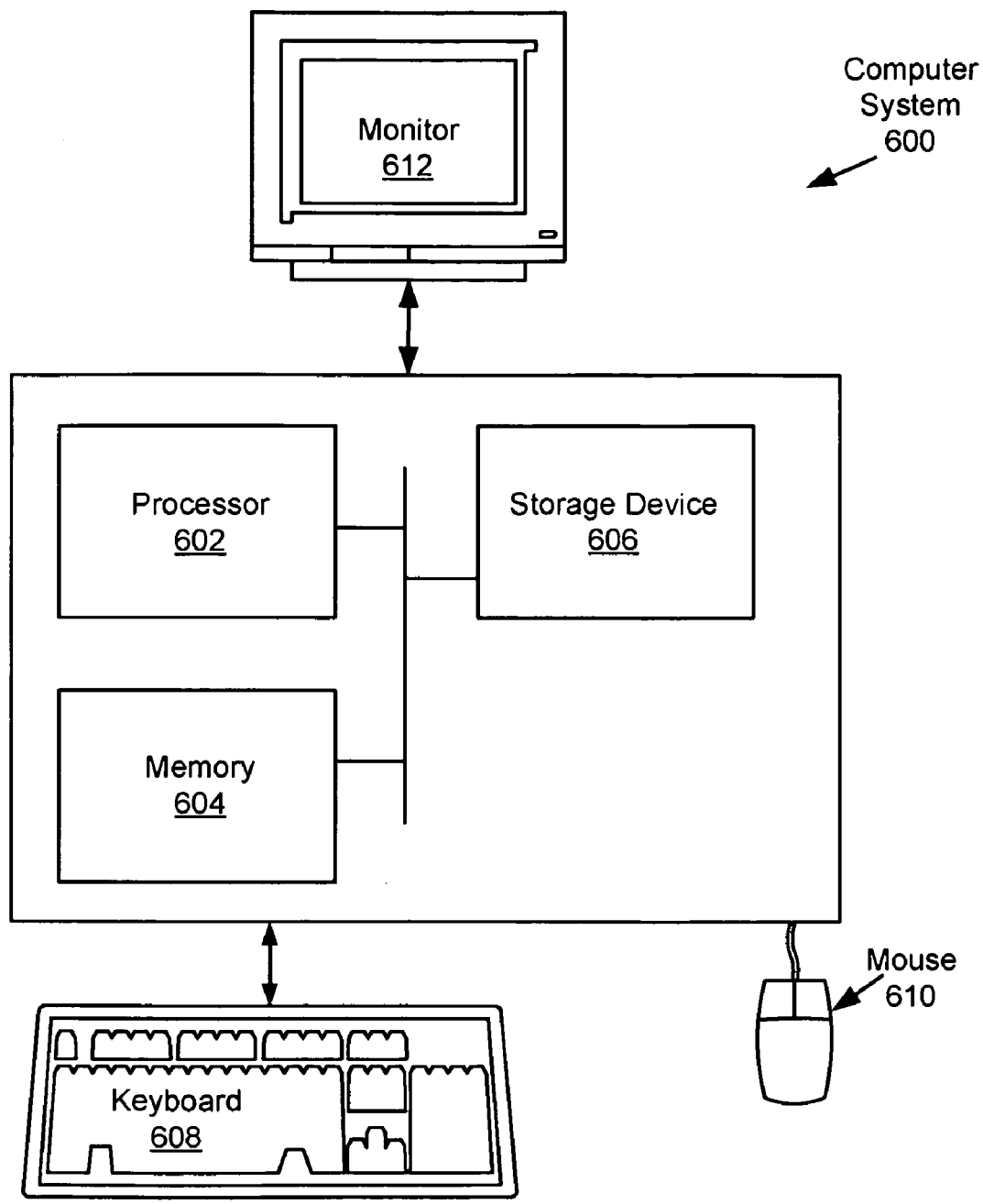
FIG. 6 shows a diagram of a computer system in accordance with one or more embodiments of the invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer system (600) may also include input means, such as a keyboard (608) and a mouse (610), and output means, such as a monitor (612). The computer system (600) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for providing payroll information for a worker of an employer, comprising:
   obtaining, from the worker and by a payroll preview application executing on a processor of a computer system, a number of hours worked by the worker during a portion of a current payroll period that has progressed;
   adding, after the portion of the current payroll period that has progressed and before an end of the current payroll period, the number of hours worked to a payroll account of the worker;
   updating, after the portion of the current payroll period that has progressed and before the end of the current payroll period, a balance of the payroll account using the number of hours worked by the worker to obtain an updated balance for the current payroll period that has not fully progressed;
   calculating, using the processor and before the end of the current payroll period, a compensation amount for the worker based on the updated balance and an hourly wage for the worker;
   calculating, using the processor and before the end of the current payroll period, a predictive compensation amount for the worker by dividing the compensation amount by a fraction of the current payroll period that has progressed;
   displaying, to the worker, the compensation amount accrued based on the number of hours worked and the predictive compensation amount predicted based on the number of hours worked and the fraction of the current payroll period that has progressed;
   obtaining a compensation goal of the worker, wherein the compensation goal is a monetary amount larger than the predictive compensation;
   calculating, using the processor, a difference between the compensation goal and the predictive compensation amount;
   identifying, using the processor after the portion of the current payroll period that has progressed and before the end of the current payroll period, a distribution scheme for distributing the difference across a remaining portion of the current payroll period based on a varying number of workable hours in each of a plurality of days in the remaining portion and determining an additional number of required working hours in each of the plurality of days for the worker to reduce the difference between the compensation goal and the predictive compensation amount, wherein the varying number of workable hours is pre-determined by the worker prior to obtaining the compensation goal of the worker;
   displaying, to the worker by the payroll preview application, the additional number of required working hours in each of the plurality of days that the worker must work prior to the end of the current payroll period in order to reduce the difference between the compensation goal and the predictive compensation amount; and
   issuing a payroll period compensation after the current payroll period based on the number of hours worked in the current payroll period.

2. The method of claim 1, further comprising:
   detecting an error in the number of hours worked after displaying the compensation amount and the predictive compensation amount;
   obtaining, from the worker, an updated number of hours worked for the portion of the current payroll period that has progressed, wherein the error is corrected in the updated number of hours worked;
   adding the updated number of hours worked to the payroll account of the worker;
   updating the updated balance of the payroll account using the updated number of hours worked to obtain a new updated balance;
   calculating an updated predictive compensation amount for the worker prior to the end of the current payroll period, wherein the updated predictive compensation amount is calculated using the new updated balance; and
   displaying, to the worker, the new updated balance and the updated predictive compensation amount for the current payroll period prior to the end of the current payroll period.

3. The method of claim 1, further comprising:
   obtaining a change request associated with the payroll account before obtaining the number of hours worked;
   executing a change to the payroll account based on the change request; and
   displaying verification of the execution of the change to the payroll account.

4. The method of claim 1, further comprising:
   alerting the worker about failure to submit a necessary number of hours worked in a previous payroll period.

5. A system for providing payroll information, comprising:
   a processor;
   a memory operatively connected to the processor; and
   a payroll preview application resident in memory comprising:
      a payroll engine configured to:
         obtain, from a worker, a number of hours worked by the worker during a portion of a current payroll period that has progressed;
         add, after the portion of the current payroll period that has progressed and before an end of the current payroll period, the number of hours worked to a payroll account of the worker;
         update, after the portion of the current payroll period that has progressed and before the end of the current payroll period, a balance of the payroll account using the number of hours worked by the worker to obtain an updated balance for the current payroll period that has not fully progressed;
         calculate, using the processor and before the end of the current payroll period, a compensation amount for the worker based on the updated balance and an hourly wage for the worker;
         calculate, before the end of the current payroll period, a predictive compensation amount for the worker by dividing the compensation amount by a fraction of the current payroll period that has progressed;
         obtain a compensation goal of the worker, wherein the compensation goal is a monetary amount larger than the predictive compensation;
         calculate a difference between the compensation goal and the predictive compensation amount;

identify, after the portion of the current payroll period that has progressed and before the end of the current payroll period, a distribution scheme for distributing the difference across a remaining portion of the current payroll period based on a varying number of workable hours in each of a plurality of days in the remaining portion and determine an additional number of required working hours in each of the plurality of days for the worker to reduce the difference between the compensation goal and the predictive compensation amount, wherein the varying number of workable hours is pre-determined by the worker prior to obtaining the compensation goal of the worker; and a GUI module configured to:

display, to the worker, the compensation amount accrued based on the number of hours worked and the predictive compensation amount predicted based on the number of hours worked and the fraction of the current payroll period that has progressed; and display, to the worker, the additional number of required working hours in each of the plurality of days that the worker must work prior to the end of the current payroll period in order to reduce the difference between the compensation goal and the predictive compensation amount, wherein payroll period compensation is issued after the current payroll period based on the number of hours worked in the current payroll period.

6. The system of claim 5, wherein the compensation amount and the predictive compensation amount are displayed in a web browser.

7. The system of claim 5, wherein the payroll engine is further configured to:

update a plurality of benefits of the payroll account based on number of hours worked after updating the balance; and the GUI module is further configured to:

display the plurality of updated benefits for the current payroll period prior to the end of the current payroll period.

8. A non-transitory computer readable medium storing instructions to provide payroll information, the instructions comprising functionality to:

obtain, from the worker and by a payroll preview application executing on a processor of a computer system, a number of hours worked by the worker during a portion of a current payroll period that has progressed;

add, after the portion of the current payroll period that has progressed and before an end of the current payroll period, the number of hours worked to a payroll account of the worker;

update, after the portion of the current payroll period that has progressed and before the end of the current payroll period, a balance of the payroll account using the number of hours worked by the worker to obtain an updated balance for the current payroll period that has not fully progressed;

calculate, before the end of the current payroll period, a compensation amount for the worker based on the updated balance and an hourly wage for the worker;

calculating, using the processor and before the end of the current payroll period, a predictive compensation amount for the worker by dividing the compensation amount by a fraction of the current payroll period that has progressed;

display, to the worker, the compensation amount accrued based on the number of hours worked and the predictive compensation amount predicted based on the number of hours worked and the fraction of the current payroll period that has progressed;

obtain a compensation goal of the worker, wherein the compensation goal is a monetary amount larger than the predictive compensation;

calculate a difference between the compensation goal and the predictive compensation amount;

identify after the portion of the current payroll period that has progressed and before the end of the current payroll period, a distribution scheme for distributing the difference across a remaining portion of the current payroll period based on a varying number of workable hours in each of a plurality of days in the remaining portion and determining an additional number of required working hours in each of the plurality of days for the worker to reduce the difference between the compensation goal and the predictive compensation amount, wherein the varying number of workable hours is pre-determined by the worker prior to obtaining the compensation goal of the worker;

display, to the worker by the payroll preview application, the additional number of required working hours in each of the plurality of days that the worker must work prior to the end of the current payroll period in order to reduce the difference between the compensation goal and the predictive compensation amount; and issue a payroll period compensation after the current payroll period based on the number of hours worked in the current payroll period.

9. The non-transitory computer readable medium of claim 8, the instructions further comprising functionality to:

detect an error in the number of hours worked after displaying the compensation amount and the predictive compensation amount;

obtain, from the worker, an updated number of hours worked for the portion of the current payroll period that has progressed, wherein the error is corrected in the updated number of hours worked;

add the updated number of hours worked to the payroll account of the worker;

update the updated balance of the payroll account using the updated number of hours worked to obtain a new updated balance;

calculate an updated predictive compensation amount for the worker prior to the end of the current payroll period, wherein the updated predictive compensation amount is calculated using the new updated balance; and display, to the worker, the new updated balance and the updated predictive compensation amount for the current payroll period prior to the end of the current payroll period.

10. The non-transitory computer readable medium of claim 8, the instructions further comprising functionality to:

obtain a change request associated with the payroll account before obtaining the number of hours worked;

execute a change to the payroll account based on the change request; and display verification of the execution of the change to the payroll account.

11. The non-transitory computer readable medium of claim 10, the instructions further comprising functionality to alert the worker about failure to submit a necessary number of hours worked in a previous payroll period.

* * * * *